US012182216B2

(12) United States Patent
Portman et al.

(10) Patent No.: US 12,182,216 B2
(45) Date of Patent: *Dec. 31, 2024

(54) MACHINE LEARNING MODEL AND ENCODER TO PREDICT ONLINE USER JOURNEYS

(71) Applicant: Zeta Global Corp., New York, NY (US)

(72) Inventors: Danny Portman, Atlanta, GA (US); Zachary D. Jones, Atlanta, GA (US)

(73) Assignee: Zeta Global Corp., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/345,802

(22) Filed: Jun. 30, 2023

(65) Prior Publication Data
US 2023/0350960 A1 Nov. 2, 2023

Related U.S. Application Data

(63) Continuation of application No. 17/704,872, filed on Mar. 25, 2022, now Pat. No. 11,727,073.
(Continued)

(51) Int. Cl.
*G06F 16/9535* (2019.01)
*G06F 11/34* (2006.01)
*G06N 3/04* (2023.01)

(52) U.S. Cl.
CPC ...... *G06F 16/9535* (2019.01); *G06F 11/3438* (2013.01); *G06N 3/04* (2013.01)

(58) Field of Classification Search
CPC ...... G06F 16/34; G06F 16/358; G06F 16/904; G06F 16/9535; G06F 16/9536; G06F 16/951; G06F 16/9538
See application file for complete search history.

(56) References Cited

U.S. PATENT DOCUMENTS

2010/0146144 A1* 6/2010 Audenaert ............. G06Q 30/08
709/235
2016/0078456 A1* 3/2016 Chakraborty ...... G06Q 30/0204
705/7.31
(Continued)

OTHER PUBLICATIONS

"U.S. Appl. No. 17/704,872, Notice of Allowance mailed Mar. 31, 2023", 9 pgs.

*Primary Examiner* — Kris E Mackes
(74) *Attorney, Agent, or Firm* — Schwegman Lundberg & Woessner, P.A.

(57) ABSTRACT

The subject technology identifies a series of journey event types in an online user journey, the event types including an impression event, an email event, a click event, and a website visit, and assigns an encoder to each event type. Using an assigned encoder, the technology encodes each event type to generate an encoded vector for each event type. The encoded vector is representative of at least a portion of the online user journey relating to that event type. The technology generates an encoded vector for each event type to create a set of encoded vectors, the set of encoded vectors including one or more of an impression event encoded vector, an email event encoded vector, a click event encoded vector, and a website visit encoded vector. The technology aggregates the set of encoded vectors to generate an output of the online user journey encoder, the output including a composite encoded user journey vector for modeling, transmits the output of the online user journey encoder to a user journey training model for training of the model and, using a trained model, generates an occurrence probability for at least one further event in the online user journey.

20 Claims, 9 Drawing Sheets

DIAGRAM SHOWING HOW A CUSTOMER JOURNEY IS ENCODED INTO A TIME-SERIES OF VECTORS

Related U.S. Application Data

(60) Provisional application No. 63/166,602, filed on Mar. 26, 2021.

(56) References Cited

U.S. PATENT DOCUMENTS

| | | | |
|---|---|---|---|
| 2016/0239897 A1* | 8/2016 | Ghose | G06Q 30/0631 |
| 2019/0065588 A1* | 2/2019 | Lin | G06F 16/3344 |
| 2020/0273052 A1* | 8/2020 | Ganti | G06Q 30/0204 |
| 2020/0327444 A1* | 10/2020 | Negi | G06Q 30/0631 |
| 2021/0365965 A1* | 11/2021 | Shrivastava | G06N 3/088 |
| 2022/0309117 A1 | 9/2022 | Portman et al. | |

* cited by examiner

DIAGRAM SHOWING ONE STEP OF LSTM TRAINING.
THIS DIAGRAM ALSO DEMONSTRATES HOW A CUSTOMER JOURNEY IS TRANSFORMED INTO A CONVERSION PREDICTION.

MACHINE LEARNING MODEL AND ENCODER TO PREDICT ONLINE USER JOURNEYS

CLAIM OF PRIORITY

This patent application is a continuation of U.S. patent application Ser. No. 17/704,872, filed on Mar. 25, 2022, which application claims the benefit of priority, under 35 U.S.C. Section 119(e), to Portman et al, U.S. Provisional Patent Application Ser. No. 63/166,602, entitled "CUSTOMER JOURNEY PREDICTION WITH RECURRENT NEURAL NETWORKS," filed on Mar. 26, 2021, which are hereby incorporated by reference herein in their entireties.

TECHNICAL FIELD

The subject matter disclosed herein generally relates to the technical field of machine learning models utilized in a network-based computing environment. Improved training technology including encoders is provided.

BACKGROUND

The present subject matter seeks to address technical problems existing in predicting online user activity, such as visits, actions, and transactions, and in making recommendations and presenting content to influence that activity.

BRIEF DESCRIPTION OF THE DRAWINGS

Some embodiments are illustrated by way of example and not limitation in the figures of the accompanying drawings.

DETAILED DESCRIPTION

Figure 1:
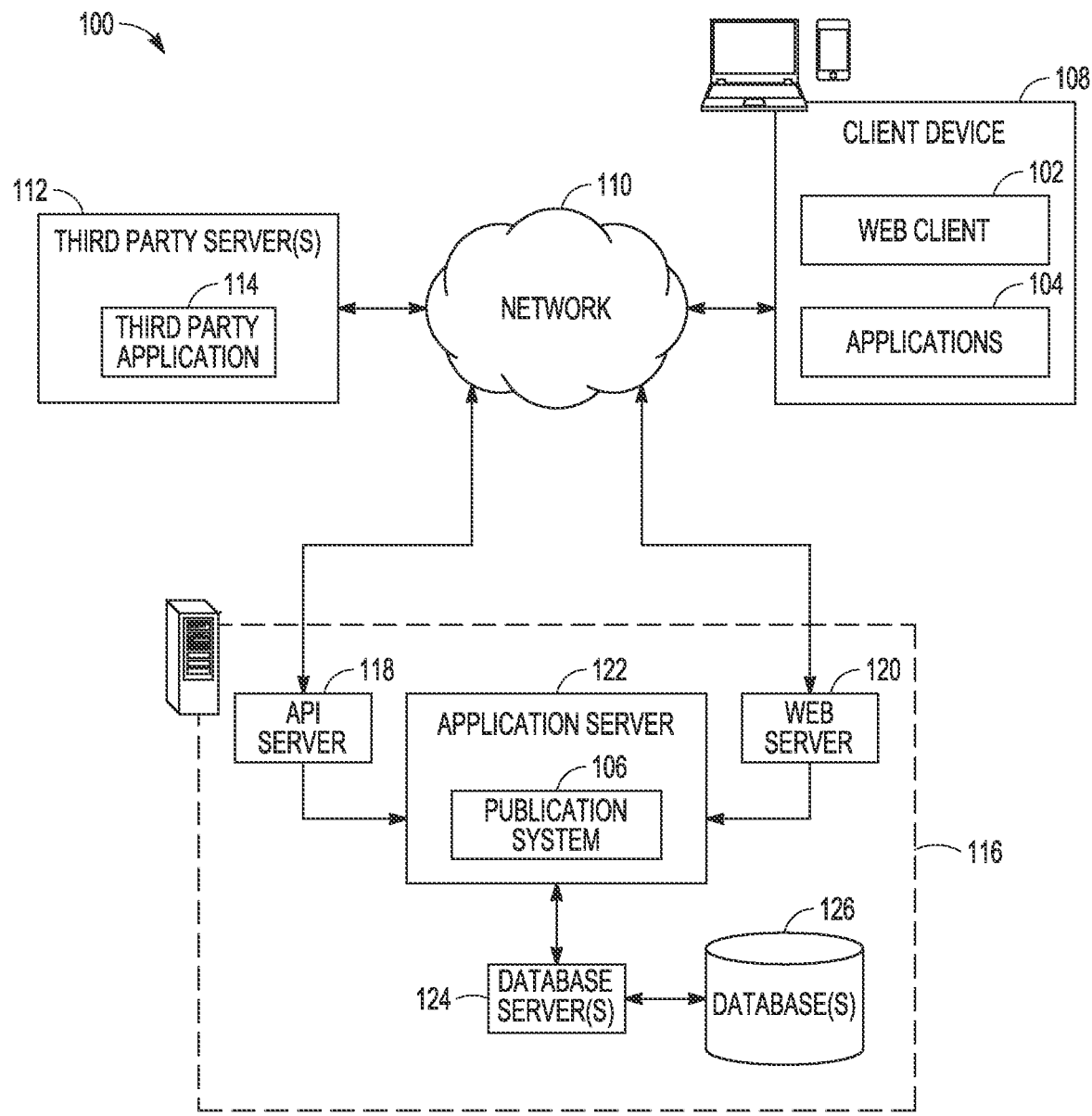
FIG. 1 is a block diagram illustrating a high-level network architecture, according to an example embodiment.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

A networked system as described herein can predict online user activity and make recommendations to influence that activity and affect a consumer path or online journey, for example. Characterizing the behavior of consumers is difficult to accomplish. Known methods involve combining information about the user that is self-reported, provided by a third-party, or imputed, along with purchase behavior, click behavior, and general information about the websites visited by the user. While this information can provide insights, it is limited. In some examples, user journeys can be predicted and companies and marketers, for example, can better guide consumers towards a more desirable path to close a transaction (or convert, for example.

In some examples, user journey data is encoded and represented as composite vectors to facilitate and enable content to be tailored for presentation to the user. In an example commercial application of the enhanced technology, content may be tailored by a client of a marketing agency. Other applications are possible.

As explained more fully below, some examples identify a series of journey event types in an online user journey, the event types including for example an impression event, an email event, a click event, and a website visit. Other event types are possible. An encoder is assigned to each event type. Using an assigned encoder, each event type is encoded to generate an encoded vector for each event type, the encoded vector being representative of at least a portion of the online user journey relating to that event type. An encoded vector is generated for each event type to create a set of encoded vectors, the set of encoded vectors including one or more of an impression event encoded vector, an email event encoded vector, a click event encoded vector, and a website visit encoded vector. A set of encoded vectors is aggregated to generate an output of the online user journey encoder, the output including a composite encoded user journey vector for modeling. Some examples transmit the output of the online user journey encoder to a user journey training model for training of the user journey training model and, using a trained model, generating an occurrence probability for at least one further event in the online user journey.

Having established an historic record of user journeys, some examples use machine learning to predict next steps for a given user and assign a probability to each predicted next step or action, either singly as one action or as an expected combination of events or actions in a journey. An example system can predict aspects such as churn, predict transactions (such as conversions), and determine optimal marketing strategies from creative content, channel of media, time of placement, and the like. An example system can predict consumer paths in real-time and adjust content presented to consumers in order to guide them down a more desired or beneficial paths.

Embodiments of the improved technology seek to address at least some of the aforementioned issues by providing and utilizing a machine learning model to predict online user activity and adapt, in an automated manner, the presentation of online content. Examples seek to determine more accurately online user activity based on the presentation of recommended content, in an influencing feedback loop. In some examples, systems and methods in accordance with the disclosure use machine learning to identify a user's potential online journey, predict what a user such as an end consumer is likely to do next, generate sequences of potential next steps for consumers that are likely to lead to a conversion event, and suggest what manner and type of content to present to a consumer to put that consumer on a path to a conversion event.

With reference to FIG. 1, an example embodiment of a high-level SaaS network architecture 100 is shown. A networked system 116 provides server-side functionality via a network 110 (e.g., the Internet or a WAN) to a client device 108. A web client 102 and a programmatic client, in the example form of a client application 104, are hosted and execute on the client device 108. The networked system 116 includes an application server 122, which in turn hosts a publication system 106 (such as a marketing agency, an advertising exchange, or a content distributor) that provides a number of functions and services to the client application 104 that accesses the networked system 116. The client application 104 also provides a number of interfaces described herein, which can present an output in accordance with the methods described herein to a user of the client device 108.

The client device 108 enables a user to access and interact with the networked system 116 and, ultimately, the publication system 106. For instance, the user provides input (e.g., touch screen input or alphanumeric input) to the client device 108, and the input is communicated to the networked system 116 via the network 110. In this instance, the networked system 116, in response to receiving the input from the user, communicates information back to the client device 108 via the network 110 to be presented to the user.

An API server 118 and a web server 120 are coupled, and provide programmatic and web interfaces respectively, to the application server 122. The application server 122 hosts the publication system 106, which includes components or applications described further below. The application server 122 is, in turn, shown to be coupled to a database server 124 that facilitates access to information storage repositories (e.g., a database 126). In an example embodiment, the database 126 includes storage devices that store information accessed and generated by the publication system 106.

Additionally, a third-party application 114, executing on one or more third-party servers 112, is shown as having programmatic access to the networked system 116 via the programmatic interface provided by the API server 118. For example, the third-party application 114, using information retrieved from the networked system 116, may support one or more features or functions on a website hosted by a third party.

Turning now specifically to the applications hosted by the client device 108, the web client 102 may access the various systems (e.g., the publication system 106) via the web interface supported by the web server 120. Similarly, the client application 104 (e.g., a marketing agency "app") accesses the various services and functions provided by the publication system 106 via the programmatic interface provided by the API server 118. The client application 104 may be, for example, an "app" executing on the client device 108, such as an iOS or Android OS application to enable a user to access and input data on the networked system 116 in an offline manner and to perform batch-mode communications between the client application 104 and the networked system 116.

Further, while the SaaS network architecture 100 shown in FIG. 1 employs a client-server architecture, the present inventive subject matter is of course not limited to such an architecture, and could equally well find application in a distributed, or peer-to-peer, architecture system, for example. The publication system 106 could also be implemented as a standalone software program, which does not necessarily have networking capabilities.

Figure 2:
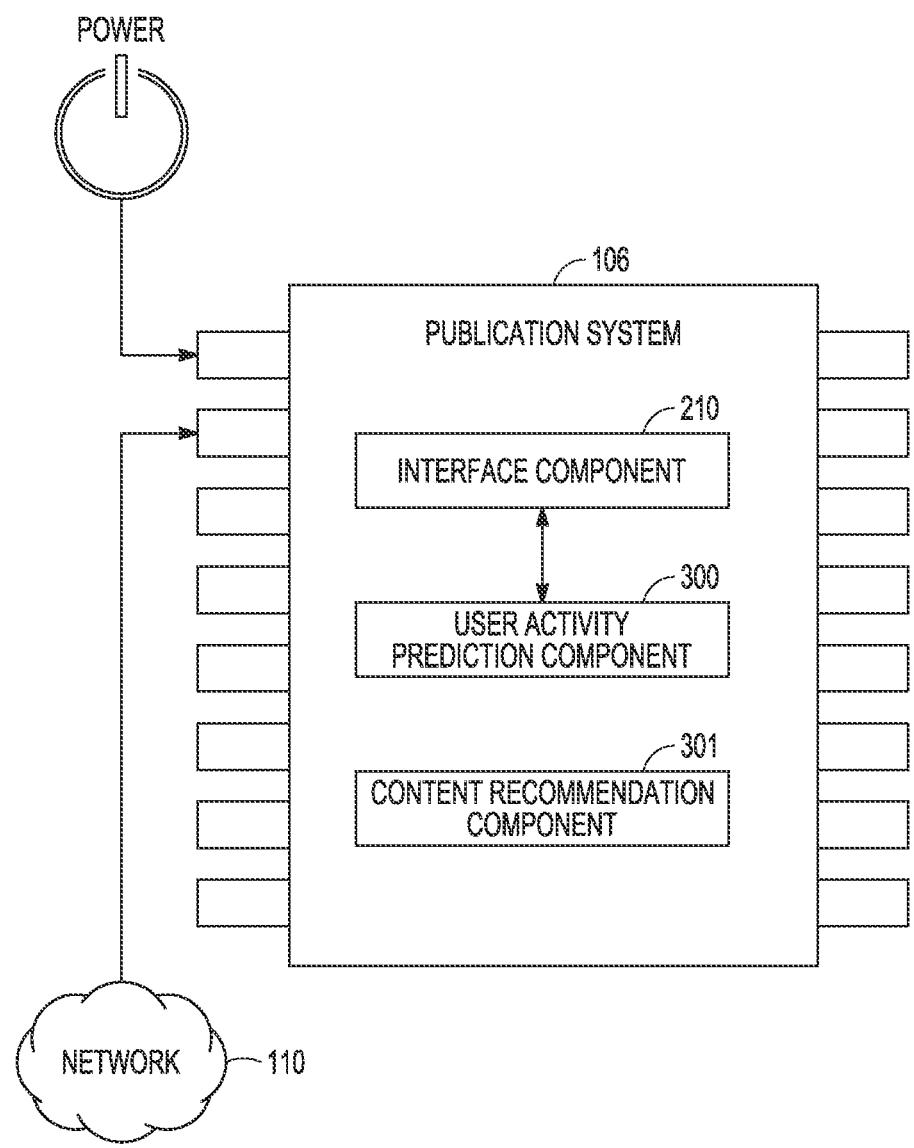
FIG. 2 is a block diagram showing architectural aspects of a publication system, according to some example embodiments.

FIG. 2 is a block diagram showing architectural details of a publication system 106, according to some example embodiments. Specifically, the publication system 106 is shown to include an interface component 210 by which the publication system 106 communicates (e.g., over a network 110) with other systems within the SaaS network architecture 100.

The interface component 210 is communicatively coupled to a user activity prediction component 300 that operates to provide online user activity (e.g., consumer activity, actions, or transactions) prediction and processing functions. The interface component 210 and the user activity prediction component 300 are also communicatively coupled to a content recommendation component 301 for recommending and tailoring creative content and the presentation of content in accordance with the methods described further below with reference to the accompanying drawings.

Figure 3:
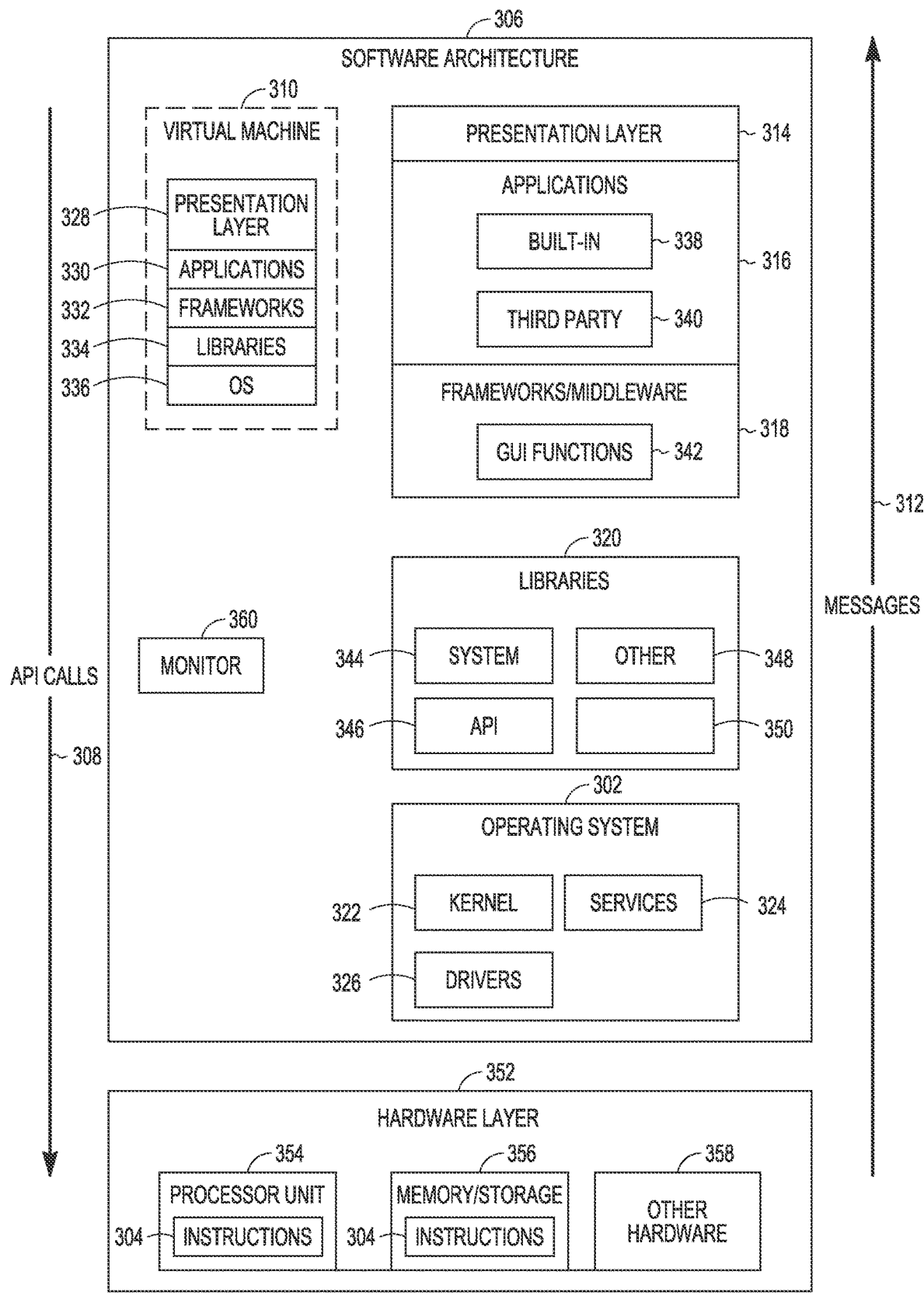
FIG. 3 is a block diagram illustrating a representative software architecture, which may be used in conjunction with various hardware architectures herein described.

FIG. 3 is a block diagram illustrating an example software architecture 306, which may be used in conjunction with various hardware architectures herein described. FIG. 3 is a non-limiting example of a software architecture 306, and it will be appreciated that many other architectures may be implemented to facilitate the functionality described herein. The software architecture 306 may execute on hardware such as a machine 400 of FIG. 4 that includes, among other things, processors 404, memory/storage 406, and input/output (I/O) components 418. A representative hardware layer 352 is illustrated and can represent, for example, the machine 400 of FIG. 4. The representative hardware layer 352 includes a processor 354 having associated executable instructions 304. The executable instructions 304 represent the executable instructions of the software architecture 306, including implementation of the methods, components, and so forth described herein. The hardware layer 352 also includes memory and/or storage modules as memory/storage 356, which also have the executable instructions 304. The hardware layer 352 may also comprise other hardware 358.

In the example architecture of FIG. 3, the software architecture 306 may be conceptualized as a stack of layers where each layer provides particular functionality. For example, the software architecture 306 may include layers such as an operating system 302, libraries 320, frameworks/middleware 318, applications 316, and a presentation layer 314. Operationally, the applications 316 and/or other components within the layers may invoke API calls 308 through the software stack and receive a response as messages 312 in response to the API calls 308. The layers illustrated are representative in nature, and not all software architectures have all layers. For example, some mobile or special-purpose operating systems may not provide a frameworks/middleware 318, while others may provide such a layer. Other software architectures may include additional or different layers.

The operating system 302 may manage hardware resources and provide common services. The operating system 302 may include, for example, a kernel 322, services 324, and drivers 326. The kernel 322 may act as an abstraction layer between the hardware and the other software layers. For example, the kernel 322 may be responsible for memory management, processor management (e.g., scheduling), component management, networking, security settings, and so on. The services 324 may provide other common services for the other software layers. The drivers 326 are responsible for controlling or interfacing with the underlying hardware. For instance, the drivers 326 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 320 provide a common infrastructure that is used by the applications 316 and/or other components and/or layers. The libraries 320 provide functionality that allows other software components to perform tasks in an easier fashion than by interfacing directly with the underlying operating system 302 functionality (e.g., kernel 322, services 324, and/or drivers 326). The libraries 320 may include system libraries 344 (e.g., C standard library) that may provide functions such as memory allocation functions, string manipulation functions, mathematical functions, and the like. In addition, the libraries 320 may include API libraries 346 such as media libraries (e.g., libraries to support presentation and manipulation of various media formats such as MPEG4, H.264, MP3, AAC, AMR, JPG, and PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 320 may also include a wide variety of other libraries 348 to provide many other APIs to the applications 316 and other software components/modules.

The frameworks/middleware 318 provide a higher-level common infrastructure that may be used by the applications 316 and/or other software components/modules. For example, the frameworks/middleware 318 may provide various graphic user interface (GUI) functions 342, high-level resource management, high-level location services, and so forth. The frameworks/middleware 318 may provide a broad spectrum of other APIs that may be utilized by the applications 316 and/or other software components/modules, some of which may be specific to a particular operating system or platform.

The applications 316 include built-in applications 338 and/or third-party applications 340. Examples of representative built-in applications 338 may include, but are not limited to, a contacts application, a browser application, a book reader application, a location application, a media application, a messaging application, and/or a game application. The third-party applications 340 may include any application developed using the ANDROID™ or IOS™ software development kit (SDK) by an entity other than the vendor of the particular platform and may be mobile software running on a mobile operating system such as IOS™, ANDROID™, WINDOWS® Phone, or other mobile operating systems. The third-party applications 340 may invoke the API calls 308 provided by the mobile operating system (such as the operating system 302) to facilitate functionality described herein.

The applications 316 may use built-in operating system functions (e.g., kernel 322, services 324, and/or drivers 326), libraries 320, and frameworks/middleware 318 to create user interfaces to interact with users of the system. Alternatively, or additionally, in some systems, interactions with a user may occur through a presentation layer, such as the presentation layer 314. In these systems, the application/component "logic" can be separated from the aspects of the application/component that interact with a user.

Some software architectures use virtual machines. In the example of FIG. 3, this is illustrated by a virtual machine 310. The virtual machine 310 creates a software environment where applications/components can execute as if they were executing on a hardware machine (such as the machine 400 of FIG. 4, for example). The virtual machine 310 is hosted by a host operating system (e.g., the operating system 302 in FIG. 3) and typically, although not always, has a virtual machine monitor 360, which manages the operation of the virtual machine 310 as well as the interface with the host operating system (e.g., the operating system 302). A software architecture executes within the virtual machine 310 such as an operating system (OS) 336, libraries 334, frameworks 332, applications 330, and/or a presentation layer 328. These layers of software architecture executing within the virtual machine 310 can be the same as corresponding layers previously described or may be different.

Figure 4:
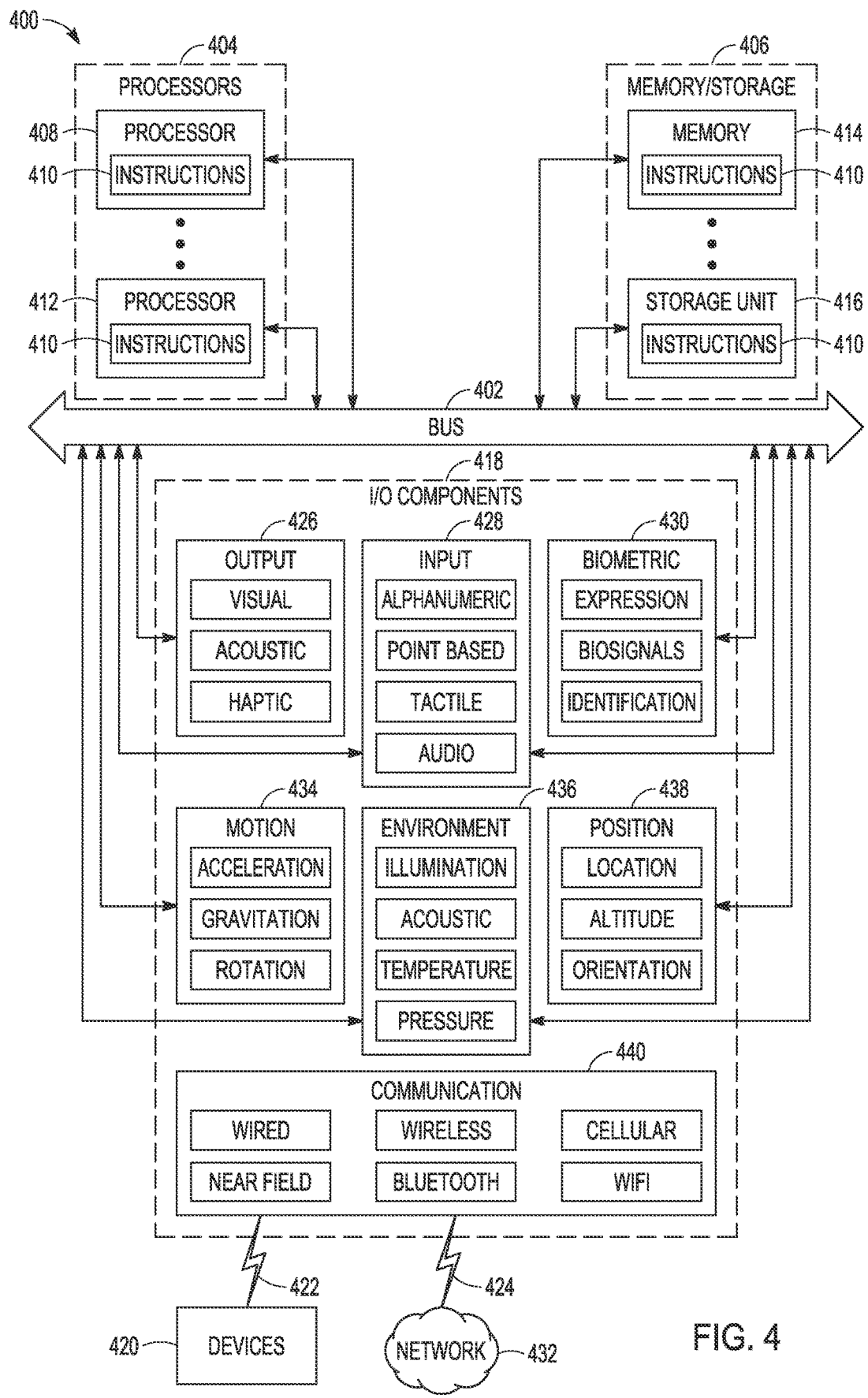
FIG. 4 is a block diagram illustrating components of a machine, according to some example embodiments, able to read instructions from a machine-readable medium (e.g., a machine-readable storage medium) and perform any one or more of the methodologies discussed herein.

FIG. 4 is a block diagram illustrating components of a machine 400, according to some example embodiments, able to read instructions from a non-transitory machine-readable medium (e.g., a non-transitory machine-readable storage medium) and perform any one or more of the methodologies discussed herein. Specifically, FIG. 4 shows a diagrammatic representation of the machine 400 in the example form of a computer system, within which instructions 410 (e.g., software, a program, an application, an applet, an app, or other executable code) for causing the machine 400 to perform any one or more of the methodologies discussed herein may be executed. As such, the instructions 410 may be used to implement modules or components described herein. The instructions 410 transform the general, non-programmed machine 400 into a particular machine 400 programmed to carry out the described and illustrated functions in the manner described. In alternative embodiments, the machine 400 operates as a standalone device or may be coupled (e.g., networked) to other machines. In a networked deployment, the machine 400 may operate in the capacity of a server machine or a client machine in a server-client network environment, or as a peer machine in a peer-to-peer (or distributed) network environment. The machine 400 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 410, sequentially or otherwise, that specify actions to be taken by the machine 400. Further, while only a single machine 400 is illustrated, the term "machine" shall also be taken to include a collection of machines that individually or jointly execute the instructions 410 to perform any one or more of the methodologies discussed herein.

The machine 400 may include processors 404 (including processors 408 and 412), memory/storage 406, and I/O components 418, which may be configured to communicate with each other such as via a bus 402. The memory/storage 406 may include a memory 414, such as a main memory, or other memory storage, and a storage unit 416, both accessible to the processors 404 such as via the bus 402. The storage unit 416 and memory 414 store the instructions 410 embodying any one or more of the methodologies or functions described herein. The instructions 410 may also reside, completely or partially, within the memory 414, within the storage unit 416, within at least one of the processors 404 (e.g., within the processor's cache memory), or any suitable combination thereof, during execution thereof by the machine 400. Accordingly, the memory 414, the storage unit 416, and the memory of the processors 404 are examples of machine-readable media.

The I/O components 418 may include a wide variety of components to receive input, provide output, produce output, transmit information, exchange information, capture measurements, and so on. The specific I/O components 418 that are included in a particular machine will depend on the type of machine. For example, portable machines such as mobile phones will likely include a touch input device or other such input mechanisms, while a headless server machine will likely not include such a touch input device. It will be appreciated that the I/O components 418 may include many other components that are not shown in FIG. 4. The I/O components 418 are grouped according to functionality merely for simplifying the following discussion, and the grouping is in no way limiting. In various example embodiments, the I/O components 418 may include output components 426 and input components 428. The output components 426 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 428 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like.

In further example embodiments, the I/O components 418 may include biometric components 430, motion components 434, environment components 436, or position components 438, among a wide array of other components. For example, the biometric components 430 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 434 may include acceleration sensor components (e.g., accelerometer), gravitation sensor components, rotation sensor components (e.g., gyroscope), and so forth. The environment components 436 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas sensors to detect concentrations of hazardous gases for safety or to measure pollutants in the atmosphere), or other components that may provide indications, measurements, or signals corresponding to a surrounding physical environment. The position components 438 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 418 may include communication components 440 operable to couple the machine 400 to a network 432 or devices 420 via a coupling 424 and a coupling 422, respectively. For example, the communication components 440 may include a network interface component or other suitable device to interface with the network 432. In further examples, the communication components 440 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 420 may be another machine or any of a wide variety of peripheral devices (e.g., a peripheral device coupled via a USB).

Moreover, the communication components 440 may detect identifiers or include components operable to detect identifiers. For example, the communication components 440 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 440, such as location via Internet Protocol (IP) geo-location, location via Wi-Fi® signal triangulation, location via detecting an NFC beacon signal that may indicate a particular location, and so forth.

Some examples provide a machine learning model to predict online user activity in view of analyzed online user journeys (e.g., transactions, conversions) from a given network(s), to improve the functionality of a computer and increase the probability of a desired online user event (e.g., machine 400, software architecture, and the like), and at the same time reduce utilization of computational resources (e.g., processor, memory, network, and the like).

Compared with previous machine learning approaches that predict an activity with lower accuracy, the subject technology provides machine learning approaches that instead identify and predict with improved accuracy a consumer's potential online journey, predict what an end consumer is likely to do next, generate sequences of potential next steps for users that are likely to lead to a conversion event, and suggest what to present to a consumer to put that consumer on a path to a conversion event. The present invention specifically tracks users' online interactions with advertisements. The users' interactions are represented at a series of time-stamped events, such as display/mobile advertisements, clicks, website visits, opened emails, conversions, and the like.

Figure 5:
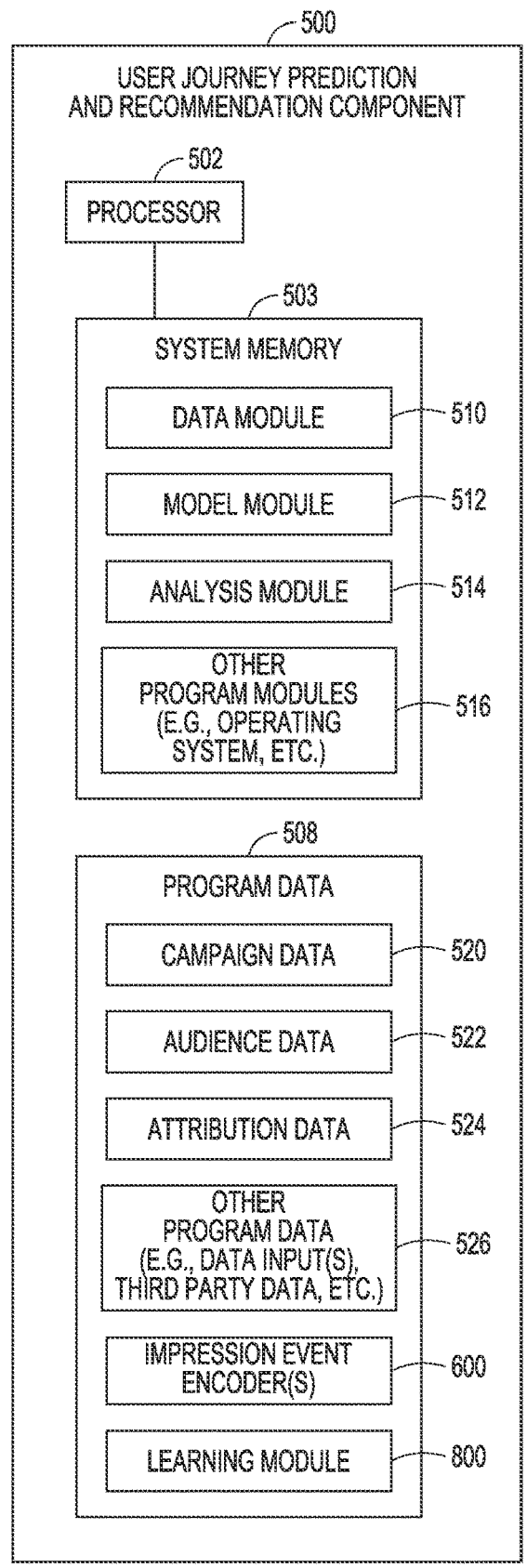
FIG. 5 depicts aspects of an integrated user journey prediction and recommendation component, according to an example embodiment.

With reference to FIG. 5, in some examples the user activity prediction component 300 and the content recommendation component 301 are combined into an integrated user journey prediction component 500. In this exemplary implementation, the user journey prediction component 500 includes at least one processor 502 coupled to a system memory 504, as shown by the block diagram in FIG. 5. The system memory 504 may include computer program modules 506 and program data 508. In this implementation program modules 506 may include a data module 510, a model module 512, an analysis module 514, and other program modules 516 such as an operating system, device drivers, and so forth. Each module 510 through 516 may include a respective set of computer-program instructions executable by one or more processors 502.

This is one example of a set of program modules, and other numbers and arrangements of program modules are contemplated as a function of the particular arbitrary design and/or architecture of user journey prediction component 500. Additionally, although shown on a single user journey prediction component 500, the operations associated with respective computer-program instructions in the program modules 506 could be distributed across multiple computing devices. Program data 508 may include campaign data 520, audience data 522, attribution data 524, and other program data 526 such as data input(s), third-party data, and/or others. In some examples, user journey prediction component 500 includes one or more impression event encoders 600 and a learning module 800, described further below.

In various embodiments, the user journey prediction component 500 collects information and transactions tied to user identifiers including third party cookies, single sign on, IP addresses, or any other means of identifying an individual end consumer and can detect patterns of transaction events. In some examples, desired transaction events may include a purchase (also called a conversion), a sign-up, a click-through for a particular client, or the like.

Some examples use long short-term memory (LSTM) to perform deep learning on the user journeys. The LSTM can model the complex time-series data of the time-stamped user events mapped to each unique user id. In these ideal embodiments, (1) historical interactions as n-length numeric vectors are encoded, (2) each recorded journey is assembled into a time-series of encoded vectors, (3) the LSTM is trained on the transformed data/encoded vectors, and (4) the LSTM predicts next stages including how to bid on available inventory, creative to place in the inventory.

Figure 6:
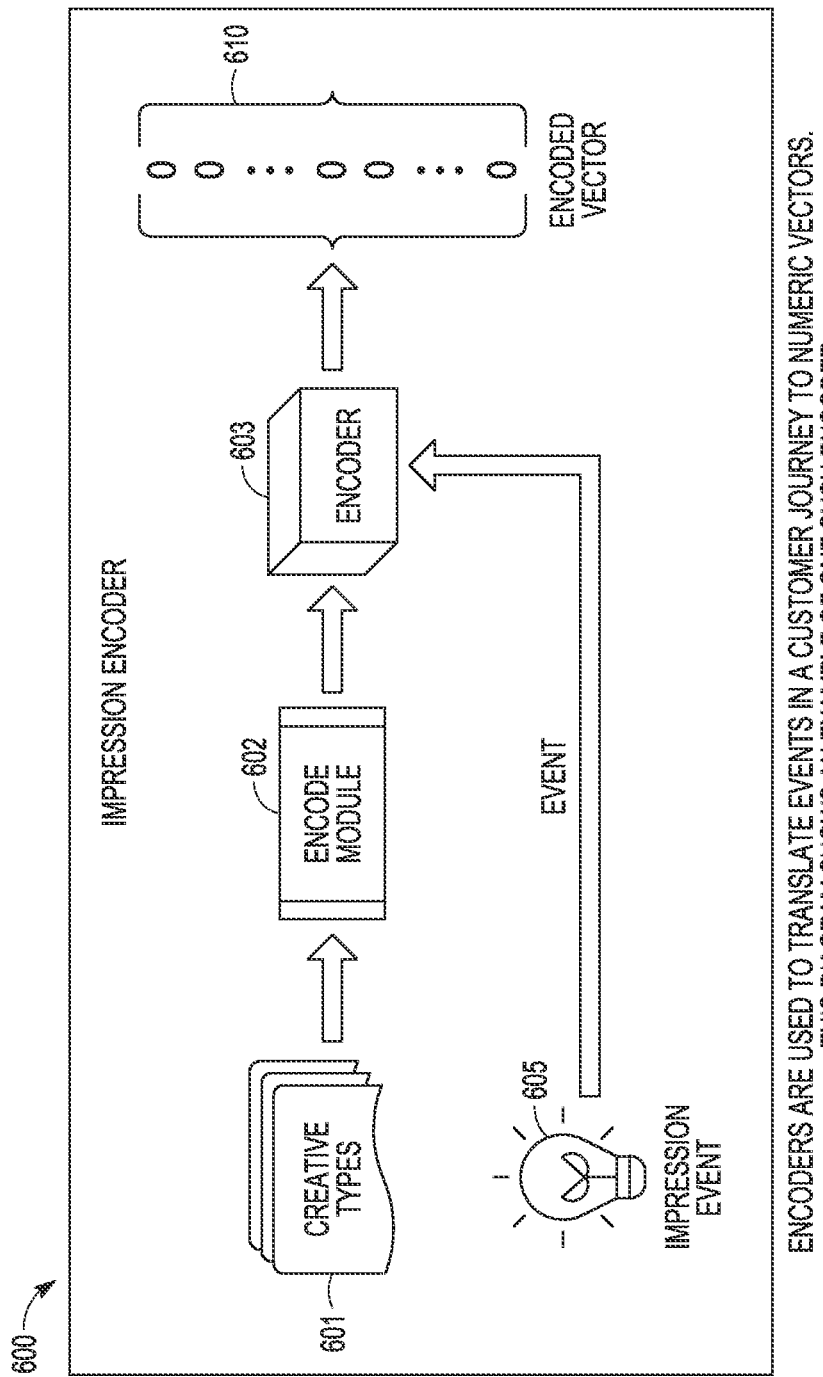
FIG. 6 depicts aspects of an impression event encoder, according to an example embodiment.

With further reference to FIG. 6 and as mentioned above, in some examples a user journey prediction component 500 includes a plurality of impression event encoders 600 for each user journey element. An example impression event encoder 600 is illustrated in FIG. 6. Impression event encoders 600 are used to translate impression events in a user journey to numeric vectors. Creative content types 601 (for example, articles, or advertisements) are parsed through an encode module 602. Output from the encode module 602 is passed to an encoder 603 in relation to a desired impression event 605. The encoder module outputs an encoded vector 610. While an impression event encoder 600 is depicted in this example as specific to impression events, in some examples one encoder or any number of encoders may be used for various other types of events in a user's online journey.

By way of example, a user with identification number (id) of, say, 123456789 may have undertaken a journey including the following events: on 1/1/21 5:30 pm, the user opened a marketing email advertising product XYZ; on 1/2/21 10:30 am, the user is shown a display advertisement using creative A; on 1/2/21 2:00 pm, the user is shown a display advertisement using creative B; on 1/2/21 2:01 pm, the user clicks advertisement with creative B and visits the advertiser's site; on 1/3/21 7 pm, the user visits the advertiser's website. The series of events is collectively classified as the user number 123456789's journey. The encoded vector 610 of user 123456789's multiple impressions is tracked and encoded by the components of the impression event encoder 600.

Figure 7:
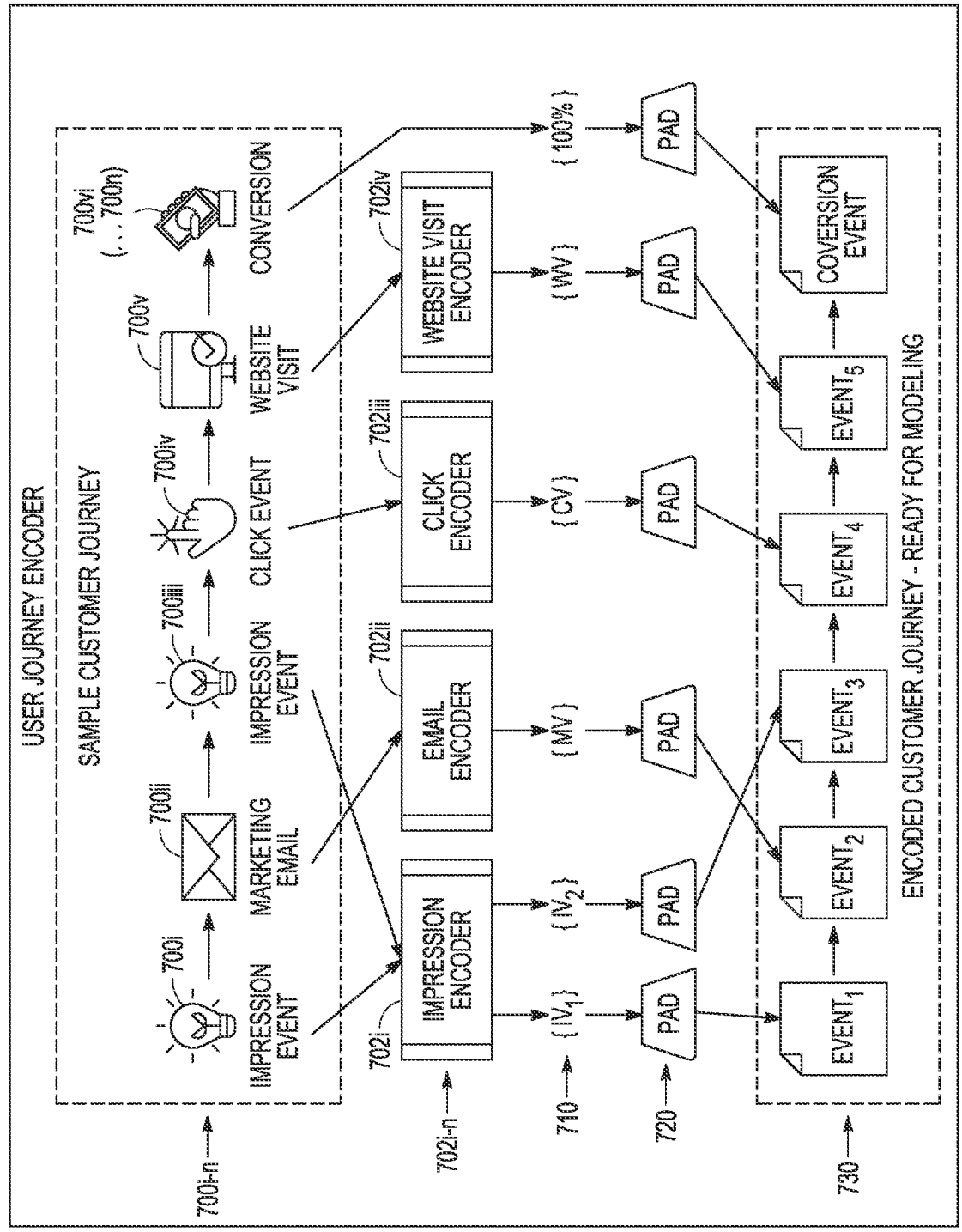
FIG. 7 depicts aspects of a user journey encoder, according to an example embodiment.

With reference to FIG. 7, further examples of a user journey prediction component 500 may include an online user journey encoder 750. The user journey encoder 750 includes different types of encoders $702i$, $702ii$, ... $702n$ for the various types of user journey events labelled $700i$-$n$. As illustrated in FIG. 7, there may be an impression event encoder $702i$, an email encoder $702ii$, a click encoder $702iii$, and a website encoder $702iv$. Each or some events in a user journey may be encoded through a respective encoder. In some examples, an output vector 710 for each encoder is padded and then re-sequenced into the correct order, for example re-sequenced into a time-based or type order. In some examples, a padding operation adds layers of zeros to input images to prevent shrinking. For example, if p=number of layers of zeros added to the border of the image, then an (n×n) image becomes (n+2p)×(n+2p) image after padding. In some examples, padding extends an area of an image in which a convolutional neural network processes. A kernel/filter (e.g., the kernel 322 of FIG. 3) which moves across the image scans each pixel and converts the image into a smaller image. Adding padding to an image processed by a convolutional neural network allows for a more accurate analysis of images.

In the illustrative example, an online user (e.g., a consumer or customer) has a user id 123456789 and has an impression event $700i$, an email event $700ii$, a second impression event $700iii$, a click event $700iv$, a website view event $700v$, and a conversion $700_{vi}$. The two impression events $700i$ and $700iii$ are encoded through the impression encoder $702i$, the email event is encoded through email encoder $702ii$, the click event is encoded through click encoder $702iii$, the website visit is encoded through website visit encoder $702iv$, and the conversion is the desired event and, in some examples, is passed directly through the journey encoder 750 without being encoded (as shown). The output vectors from each of the encoders $702i$, $702ii$, $702iii$, and $702iv$ are then passed through a respective pad 720 and re-sequenced to create an encoded user journey 730 which is ready for modeling.

While four encoders are shown in FIG. 7, other numbers or types of encoder or combinations thereof may be used in appropriate circumstances. In some examples, a conversion is a desired event, but a number of other events may be considered as the desired event.

As described in more detail below, the output from the user journey encoder 750 is in some examples passed through a user journey LSTM model. In an illustrative example, the model may indicate that probable next user steps (i.e., predicted user activity in a user journey) include, for example, a conversion with a probability of 30%, or an impression followed by a click-through with probability of 45%, or an additional website visit with a probability at 25%. Other predictions and probabilities for user activity in a user journey are possible.

In some examples, a trained model may also run additional "what if" analyses by appending theoretical events to an existing user journey. For example, the user journey prediction component 500 may generate one or more test user journeys that append one or more theoretical events (e.g., theoretical impression events, theoretical email events, theoretical click events, theoretical website visit events, and the like) to an existing user journey. The test user journeys may then be encoded by the user journey encoder 750 to generate a set of encoded test customer journeys that may be modeled. The trained model may evaluate each test journey in a set of encoded test customer journeys to determine a probability of a desired outcome for each test journey. The user journey prediction component 500 can then automatically suggest presenting the creative associated with the test journey having the higher probability of leading to the desired event. For example, the user journey prediction component may suggest presenting an email creative after an impression event and click event based on a test journey including a theoretical email event following an impression event and click event having the highest probability of leading to a conversion or other desired outcome.

The trained model may also assign an attribution probability score to each of the theoretical events in the test journeys in order to distinguish the theoretical event that makes the greatest contribution to a desired event. For example, test journey 1 may have a theoretical email event with an attribution probability score of 45%, test journey 2 may have a theoretical impression event with an attribution probability score of 20%, and test journey 3 may have a theoretical click event with an attribution probability score of 25%. To facilitate a conversion or other desired event, the user journey prediction component 500 may suggest presenting email creative based on the theoretical email mail event having the highest attribution probability score.

The model may also indicate how the probability of conversion is affected by differing creative types by comparing probabilities of outcomes between showing creative type A or creative type B. The model may also indicate how the existing journey is augmented with varying impression event for both creatives. In some embodiments, the system will suggest augmented journeys for user id 123456789's journey with the two different creative types and determine a probability for a desired outcome or each. The predictive probabilities for the two competing creative outcomes dictate the creative type that is likely to result in a preferred or desired outcome. The user journey prediction component 500 can then automatically suggest presenting the creative with the higher probability of leading to the desired event. In some examples, the augmented user journey vectors may relate to different medias, different timing, different channels, different creative image, different creative text, a combination of them, or any other different variant.

Figure 8:
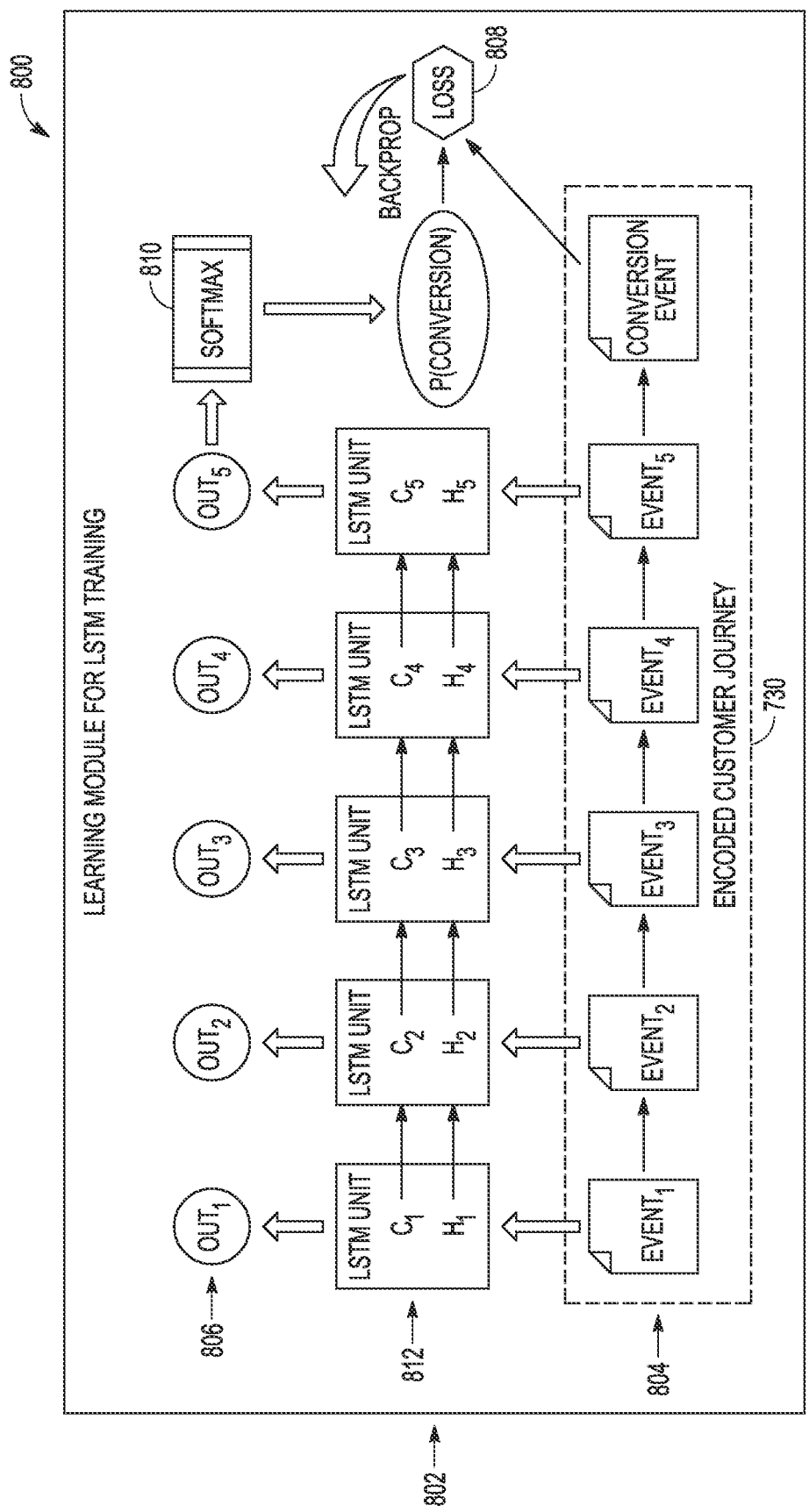
FIG. 8 depicts aspects of a learning module, according to an example embodiment.

With reference to FIG. 8, and as mentioned above, in some examples a user journey prediction component 500 includes a learning module 800. In FIG. 8, an example learning module 800 is composed of a cell 802, an input gate (represented by row 804), an output gate (represented by row 806), and a forget (or "loss") gate 808. The cell 802 remembers values over arbitrary time intervals and the three gates (or rows) 804, 806, and 808 regulate the flow of information into and out of the cell 802. The learning module 800 runs each of the encoded steps of the user journey 730 through the LSTM training. As compared to a conventional time-stamped event, for example, the encoded steps (or representative vectors) are a powerful tool for providing fast data access and manipulation in machine learning. The recurrent network is comprised of the input gates 804 and output gates 806 and each or either of these gates may include hidden layers and probability software (such as SoftMax) 810 that generates a probability of conversion. A determined probability of conversion, along with the encoded user journey conversion event, are fed through the forget gate 808 with backpropagation. Illustrated are several LSTM units 812 processing variables C and H containing weights of the input and recurrent connections.

In some examples, the recurrent neural network using the LSTM units 812 can be trained in a supervised fashion, on a set of training sequences, using an optimization algorithm, such as gradient descent, combined with backpropagation through time to compute gradients needed during the optimization process, in order to change each weight of the LSTM network in proportion to the derivative of the error with respect to the corresponding weight. Some examples that employ gradient descent include an error cut-off. Some examples employ stacks of recurrent neural networks and are trained by connectionist temporal classification to find a weight matrix that maximizes the probability of the sequence in the training set. In some examples, only parts of the recurrent neural network is trained, or only part of the network is supervised. Once trained, the learning module 800 may use probabilities of predictive paths to adjust bidding on inventory, place creative to guide down a more desirable journey path, or any other means.

Thus, in some examples, there is provided an online user journey encoder comprising: one or more processors; and a memory storing instructions which, when executed by at least one processor in the one or more processors, cause the at least one processor to perform operations comprising: identifying a series of journey event types in an online user journey, the event types including an impression event, an email event, a click event, and a website visit; assigning an encoder to each event type; using an assigned encoder, encoding each event type to generate an encoded vector for each event type, the encoded vector being representative of at least a portion of the online user journey relating to that event type; generating an encoded vector for each event type to create a set of encoded vectors, the set of encoded vectors including one or more of an impression event encoded vector, an email event encoded vector, a click event encoded vector, and a website visit encoded vector; aggregating the set of encoded vectors to generate an output of the online user journey encoder, the output including a composite encoded user journey vector for modeling; transmitting the output of the online user journey encoder to a user journey training model for training of the user journey training model; and using a trained model, generating an occurrence probability for at least one further event in the online user journey.

In some examples, the user journey training model includes a long short-term memory (LSTM). In some examples, the at least one further event includes a conversion event.

In some examples, the operations further comprise determining how the occurrence probability of the conversion event is affected by differing content items associated with the series of journey event types. In some examples, the operations further comprise optimizing an occurrence probability of the conversion event using differing content items associated with the series of journey event types. In some examples, the operations further comprise augmenting the composite encoded user journey vector based on one or more of a media type, a timing, a media channels, an image, and a text or email content.

Figure 9:
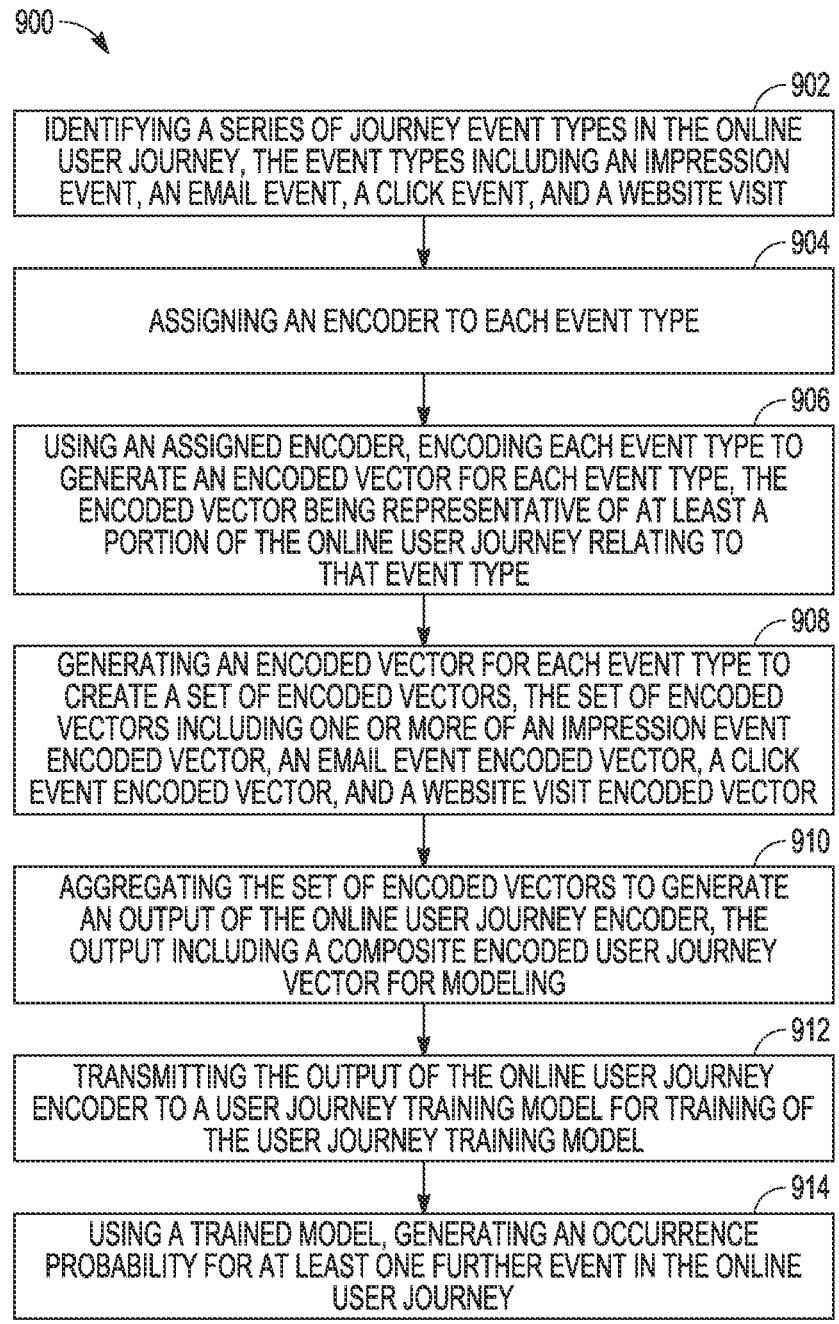
FIG. 9 is a flow chart depicting operations in a method, according to an example embodiment.

Some present examples also include methods. FIG. 9 is a flow diagram illustrating example operations in a method 900 encoding an online user journey, the method 900 including, at operation 902, identifying a series of journey event types in the online user journey, the event types including an impression event, an email event, a click event, and a website visit; at operation 904, assigning an encoder to each event type; at operation 906, using an assigned encoder, encoding each event type to generate an encoded vector for each event type, the encoded vector being representative of at least a portion of the online user journey relating to that event type; at operation 908, generating an encoded vector for each event type to create a set of encoded vectors, the set of encoded vectors including one or more of an impression event encoded vector, an email event encoded vector, a click event encoded vector, and a website visit encoded vector; at operation 910, aggregating the set of encoded vectors to generate an output of the online user journey encoder, the output including a composite encoded user journey vector for modeling; at operation 912, transmitting the output of the online user journey encoder to a user journey training model for training of the user journey training model; and, at operation 914, using a trained model, generating an occurrence probability for at least one further event in the online user journey.

In some examples, the user journey training model includes a long short-term memory (LSTM). In some examples, the at least one further event includes a conversion event.

In some examples, the method 900 further comprises determining how the occurrence probability of the conversion event is affected by differing content items associated with the series of journey event types.

In some examples, the method 900 further comprises optimizing an occurrence probability of the conversion event using differing content items associated with the series of journey event types.

In some examples, the method 900 further comprised augmenting the composite encoded user journey vector based on one or more of a media type, a timing, a media channels, an image, and a text or email content.

In some examples, a non-transitory machine-readable medium comprising instructions which, when read by a machine, cause the machine to perform operations in a method of encoding an online user journey, the operations comprising at least those summarized above, or described elsewhere herein.

In this disclosure, the following definitions may apply in context. A "Client Device" or "Electronic Device" refers to any machine that interfaces to a communications network to obtain resources from one or more server systems or other client devices. A client device may be, but is not limited to, a mobile phone, desktop computer, laptop, portable digital assistant (PDA), smart phone, tablet, ultra-book, netbook, laptop, multi-processor system, microprocessor-based or programmable consumer electronic system, game console, set-top box, or any other communication device that a user may use to access a network.

"Communications Network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network, and coupling may be a Code Division Multiple Access (CDMA) connection, a Global System for Mobile communications (GSM) connection, or another type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

"Component" (also referred to as a "module") refers to a device, physical entity, or logic having boundaries defined by function or subroutine calls, branch points, application programming interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components.

A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors.

It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instant in time. For example, where a hardware component includes a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instant of time and to constitute a different hardware component at a different instant of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"Machine-Readable Medium" in this context refers to a component, device, or other tangible medium able to store instructions and data temporarily or permanently and may include, but not be limited to, random-access memory (RAM), read-only memory (ROM), buffer memory, flash memory, optical media, magnetic media, cache memory, other types of storage (e.g., Erasable Programmable Read-Only Memory (EPROM)), and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"Processor" refers to any circuit or virtual circuit (a physical circuit emulated by logic executing on an actual processor) that manipulates data values according to control signals (e.g., "commands," "op codes," "machine code," etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), or any combination thereof. A processor may further be a multi-core processor having two or more independent processors (sometimes referred to as "cores") that may execute instructions contemporaneously.

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

Although the subject matter has been described with reference to specific example embodiments, it will be evident that various modifications and changes may be made to these embodiments without departing from the broader spirit and scope of the disclosed subject matter. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Description, therefore, is not to be taken in a limiting sense, and the scope of various embodiments is defined only by any appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Com-

What is claimed is:

1. A system for predicting online user activity comprising:
one or more processors; and
a memory storing instructions which, when executed by at least one processor in the one or more processors, cause the at least one processor to:
identify multiple journey event types in a sample of multiple online user journeys;
assign an encoder to each event type;
use an assigned encoder, encoding each instance of a particular event type in the sample to generate an encoded vector for the particular event type, the encoded vector being representative of at least a portion of one or more of the multiple online user journeys that relates to the particular event type;
generate an encoded vector for each event type to create a set of encoded vectors;
aggregate the set of encoded vectors to generate an output of the online user journey encoder, the output including a composite encoded user journey vector for modeling;
transmit the output of the online user journey encoder to a user journey training model for training of a user journey model; and
use a trained model, generating an occurrence probability for at least one further event in an online user journey.

2. The system of claim 1, wherein the user journey model includes a long short-term memory (LSTM).

3. The system of claim 1, wherein the at least one further event includes a conversion event.

4. The system of claim 3, wherein the processor is further configured to determine how the occurrence probability of the conversion event is affected by differing content items associated with one or more of the multiple journey event types.

5. The system of claim 3, wherein the processor is further configured to optimize an occurrence probability of the conversion event using differing content items associated with one or more of the multiple journey event types.

6. The system of claim 1, wherein the processor is further configured to augment the composite encoded user journey vector based on one or more of a media type, a timing, a media channels, an image, and a text or email content.

7. The system of claim 1, wherein the processor is further configured to map each instance of one or more of the multiple event types to a unique user id.

8. A method of predicting online user activity, the method comprising:
identifying multiple journey event types in a sample of multiple online user journeys;
assigning an encoder to each event type;
using an assigned encoder, encoding each instance of a particular event type in the sample to generate an encoded vector for the particular event type, the encoded vector being representative of at least a portion of one or more of the multiple online user journeys that relates to the particular event type;
generating an encoded vector for each event type to create a set of encoded vectors;
aggregating the set of encoded vectors to generate an output of an online user journey encoder, the output including a composite encoded user journey vector for modeling;
transmitting the output of the online user journey encoder to a user journey training model for training of a user journey model; and
using a trained model, generating an occurrence probability for at least one further event in an online user journey.

9. The method of claim 8, wherein the user journey model includes a long short-term memory (LSTM).

10. The method of claim 8, wherein the at least one further event includes a conversion event.

11. The method of claim 10, further comprising determining how the occurrence probability of the conversion event is affected by differing content items associated with one or more of the multiple journey event types.

12. The method of claim 10, further comprising optimizing an occurrence probability of the conversion event using differing content items associated with one or more of the multiple journey event types.

13. The method of claim 8, further comprising augmenting the composite encoded user journey vector based on one or more of a media type, a timing, a media channels, an image, and a text or email content.

14. The method of claim 8, further comprising mapping each instance of one or more of the multiple event types to a unique user id.

15. A non-transitory machine-readable medium comprising instructions which, when read by a machine, cause the machine to perform operations in a method of predicting online user activity, the operations comprising:
identifying a multiple journey event types in a sample of multiple online user journeys;
assigning an encoder to each event type;
using an assigned encoder, encoding each instance of a particular event type in the sample to generate an encoded vector for the particular event type, the encoded vector being representative of at least a portion of one or more of the multiple online user journeys that relates to the particular event type;
generating an encoded vector for each event type to create a set of encoded vectors;
aggregating the set of encoded vectors to generate an output of an online user journey encoder, the output including a composite encoded user journey vector for modeling;
transmitting the output of the online user journey encoder to a user journey training model for training of a user journey model; and
using a trained model, generating an occurrence probability for at least one further event in the online user journey.

16. The medium of claim 15, wherein the user journey training model includes a long short-term memory (LSTM).

17. The medium of claim 15, wherein the at least one further event includes a conversion event.

18. The medium of claim 17, wherein the operations further comprise determining how the occurrence probability of the conversion event is affected by differing content items associated with one or more of the multiple journey event types.

19. The medium of claim 17, wherein the operations further comprise optimizing an occurrence probability of the conversion event using differing content items associated with one or more of the multiple journey event types.

20. The medium of claim 15, wherein the operations further comprise augmenting the composite encoded user journey vector based on one or more of a media type, a timing, a media channels, an image, and a text or email content.

\* \* \* \* \*